United States Patent [19]

Costa

[11] 4,375,348
[45] Mar. 1, 1983

[54] CUTTING MACHINE FOR TRIANGLE CUTTING SHEETS OF PASTRY

[76] Inventor: Maurizio D. Costa, Via Trento, 36, 20090 Cesano Boscone (Milano), Italy

[21] Appl. No.: 90,334

[22] Filed: Nov. 1, 1979

[30] Foreign Application Priority Data

Nov. 29, 1978 [IT] Italy .................. 30334 A/78

[51] Int. Cl.³ ............................................. A21J 11/00
[52] U.S. Cl. .................. 425/305.1; 425/297; 425/298
[58] Field of Search ............ 425/305.1, 297, 298

[56] References Cited

U.S. PATENT DOCUMENTS 3,439,632  4/1969  Pirotsky .................. 425/305.1
3,596,613  11/1968  Roth ...................... 425/305.1

*Primary Examiner*—James H. Derrington
*Attorney, Agent, or Firm*—Bucknam and Archer

[57] ABSTRACT

A machine for automatically forming croissants, brioches and the like comprises a pastry flattening out stage, a cutting stage, a cut triangle spacing and orienting stage, a triangle aligning stage and a forming stage, the sheet pastry triangle spacing and orienting stage include, substantially a mechanism, effective to reciprocate on two wheels, in such a way as to take up the sheet pastry triangles and release the sheet pastry triangles at the forming machine, the reciprocating movement being transmitted to the mechanism by two side tie-rods, pivoted at one end to a cam and, at the other end, to an intermediate point of a lever supporting the mechanism at the rear portion, the mechanism comprising a plurality of cams and transmitting elements acting on catching movable elements effective, during the advancing stroke, to spread apart and rotate through a 90° angle. In the pastry flattening out stage, the pastry is flattened and is then conveyed by a conveyor belt to a cutting cylinder formed by a plurality of parallel disc elements having slanted blades defining a plurality of triangle shaped gaps.

13 Claims, 11 Drawing Figures

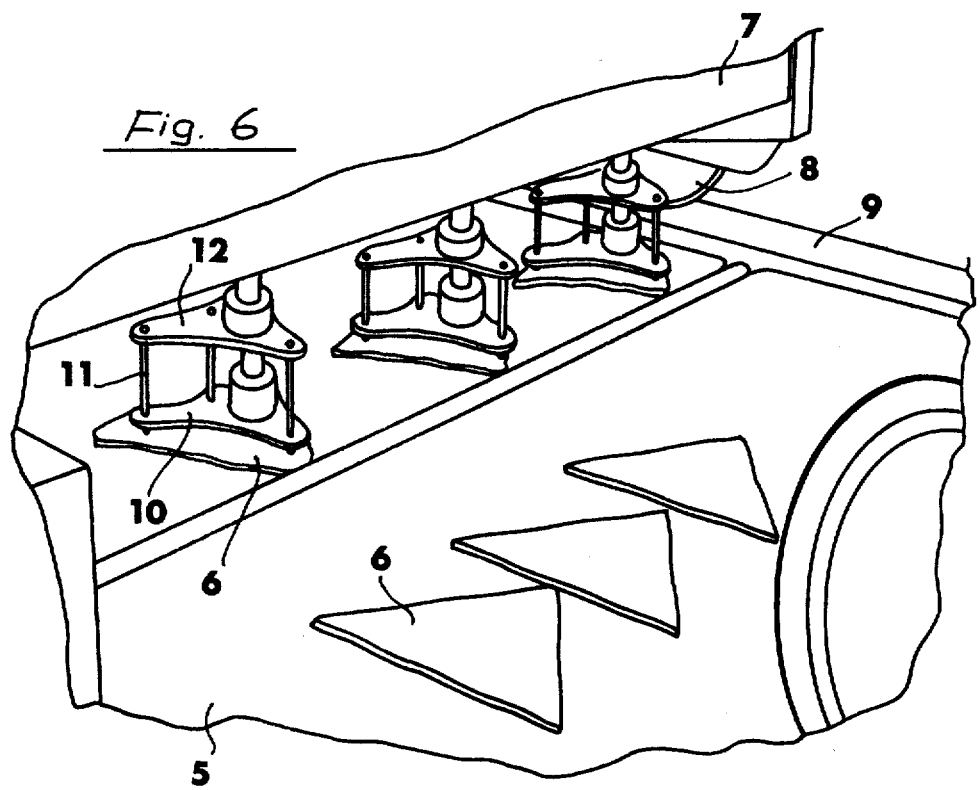
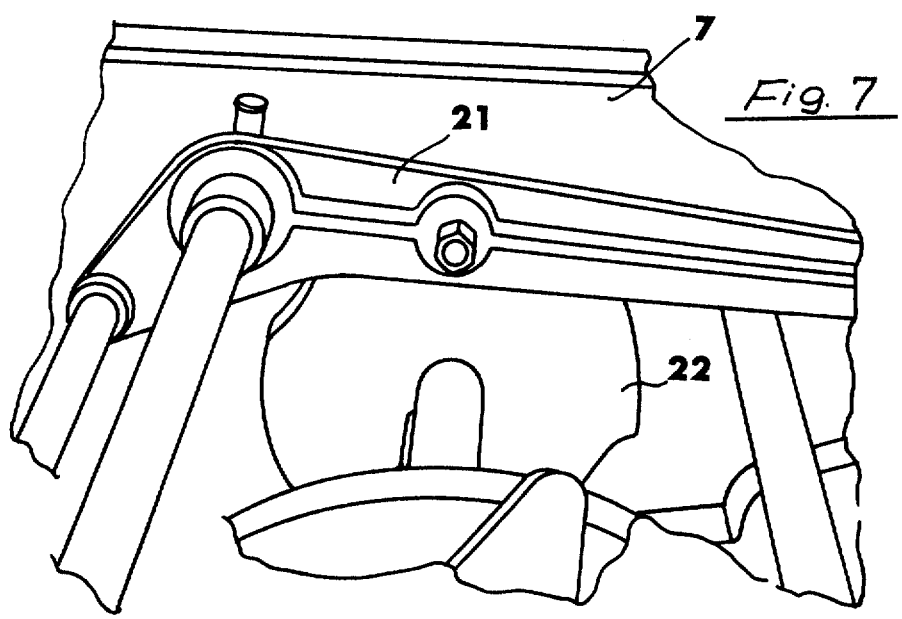

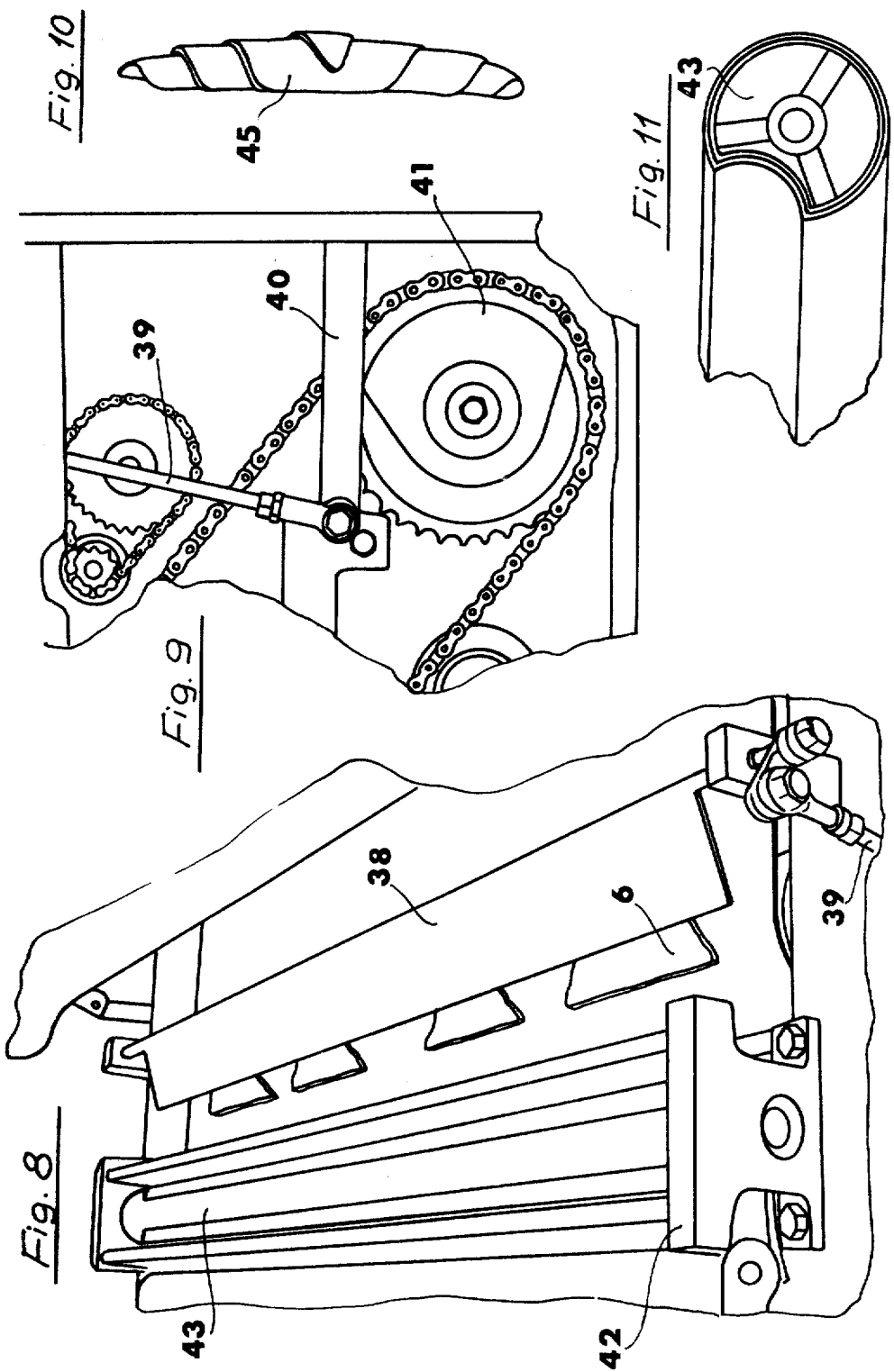

CUTTING MACHINE FOR TRIANGLE CUTTING SHEETS OF PASTRY

The present invention relates to a machine or apparatus effective to flatten out pastry sheets and to cut in triangles the formed flattened sheet of pastry.

The instant machine, furthermore, is effective to rotate and suitably space the thus obtained pastry sheet triangles, and to roll up said pastry triangle in such a way as to form croissants, brioches and the like.

As it is known, in the making of croissants, brioches and the like, the pastry, as preliminarly flattened out, has to be cut in triangle elements which are then rolled up starting from one of the sides towards the opposing apex.

These operations presently require manual actions by the operators, to catch and transport the pastry sheet triangles to the forming machine.

In fact, the provided cutting cylinders, which cut off the pastry sheet in triangles, supply said pastry sheet triangles in adjoining and opposing positions and accordingly they are not able of being directly conveyed to the aforesaid forming machine.

It is an object of the present invention to provide such a machine effective to carry out in a quick, continuous and hygienic way the flattening out operation of the pastry for croissants, brioches and the like, and effective to cut the sheet pastry in triangles.

Another object of the present invention is to provide such a machine effective to automatically take up, rotate and suitably space the individual sheet pastry triangles to be conveyed to the subsequent rolling up step.

A further object of the present invention is to provide such a machine effective to supply aligned sheet pastry triangles having the base thereof faced to the forming machine which simultaneously winds said triangles.

The aforesaid and other objects are achieved by the operating machine or apparatus according to the present invention.

This machine, or apparatus, comprises, substantially, a pastry flattening out stage, or section, a cutting stage, a cut triangle spacing and orienting stage, a triangle aligning stage and a forming stage.

In particular, the sheet pastry triangle spacing and orienting stage comprises, schematically, an oil bath mechanism, effective to alternatively move on two wheels in such a way as to take up the sheet pastry triangles and release said triangle near to the forming machine.

This reciprocating movement is transmitted to the mechanism by means of two side tie rods, pivoted at one end thereof to a cam and, at the other end thereof to an intermediate point of a lever supporting said mechanism at the rear portion thereof.

The aforesaid mechanism comprises a cam and transmission element series, acting on catching movable elements which, during the advancing step of said mechanism are capable of spreading apart and rotating through 90°.

Practically, said elements catch the individual sheet pastry triangles thereby conveying said triangles on the conveyor belt directing said triangles to the forming machine, in such a way as to present the triangles to said forming machine from the base side and as suitably spaced.

These and other characteristics, of functional and constructional nature of the automatic operating machine for forming croissants, brioches and the like according to the present invention will become more apparent from the several figures of the accompanying drawings, where:

FIG. 6 illustrates the operating sequence of the aforesaid catching elements;

FIG. 7 illustrates the cam element driving the catching and releasing operations of the sheet pastry triangles;

FIG. 8 illustrates a movable baffle element effective to align said sheet pastry triangles prior to the conveying thereof to the forming machine;

FIG. 9 illustrates the mechanism effective to rise said baffle element;

FIG. 10 illustrates a sheet pastry triangle as rolled up by the forming machine;

FIG. 11 is a partial view illustrating the cylinder of said forming machine.

Referring particularly to the numeric references to the several figures of the accompanying drawings, the machine or apparatus for automatically forming croissants and brioches according to the invention comprises a flattening out stage or section (1) therefrom the pastry, as suitably flattened, is conveyed by means of a conveying belt, to a cutting cylinder (2).

Said cutting cylinder consists of a plurality of parallel discs therebetween slanted blades (3) are located defining a triangular gap series therewithin an ejector piston (4) is located.

Figure 1:
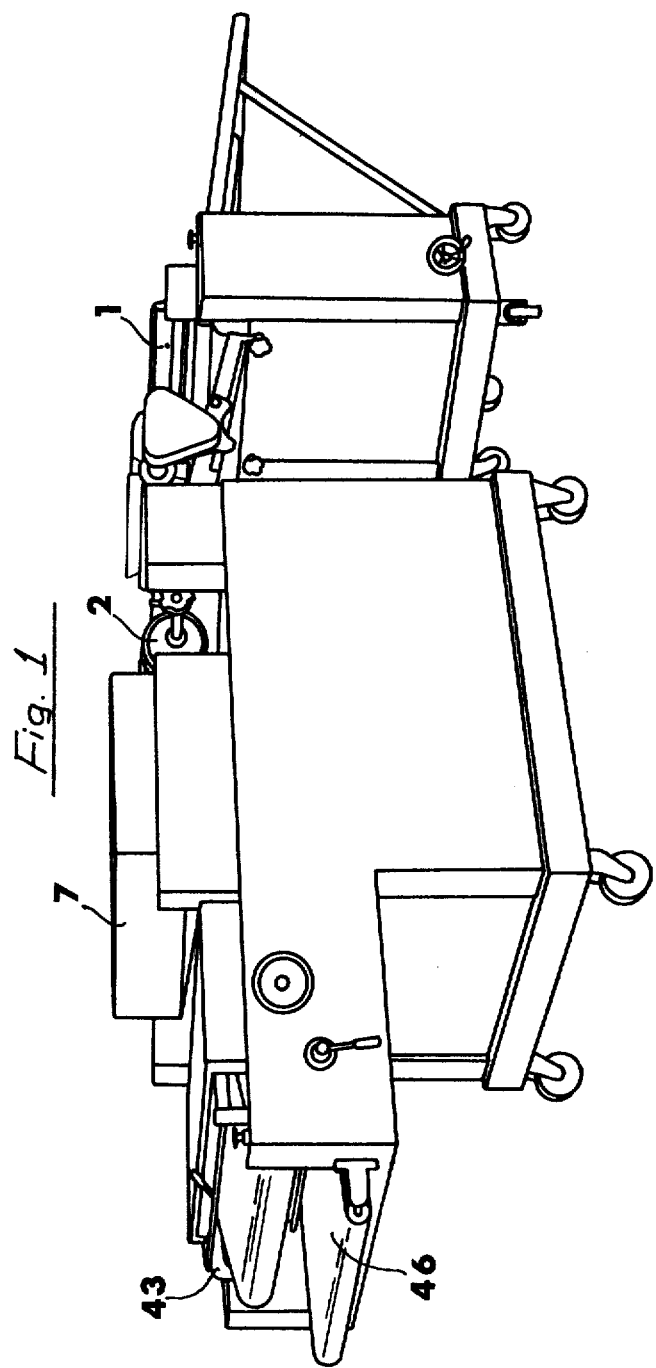
FIG. 1 is a perspective schematic view illustrating the instant machine or apparatus.
Figure 2:
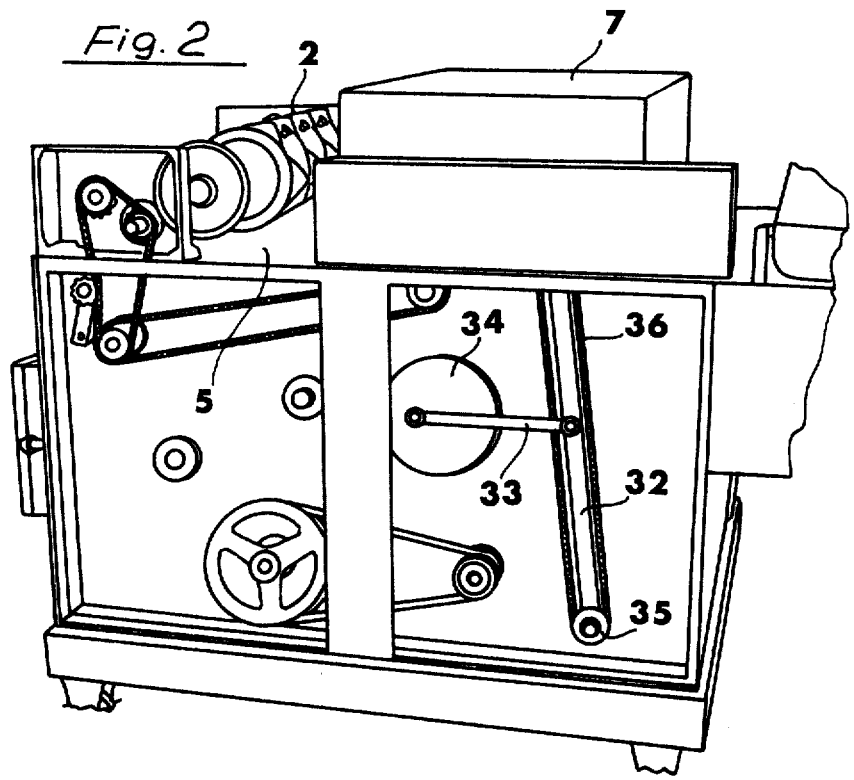
FIG. 2 illustrates the sheet pastry cutting and obtained sheet pastry triangles conveying stage or section.
Figure 3:
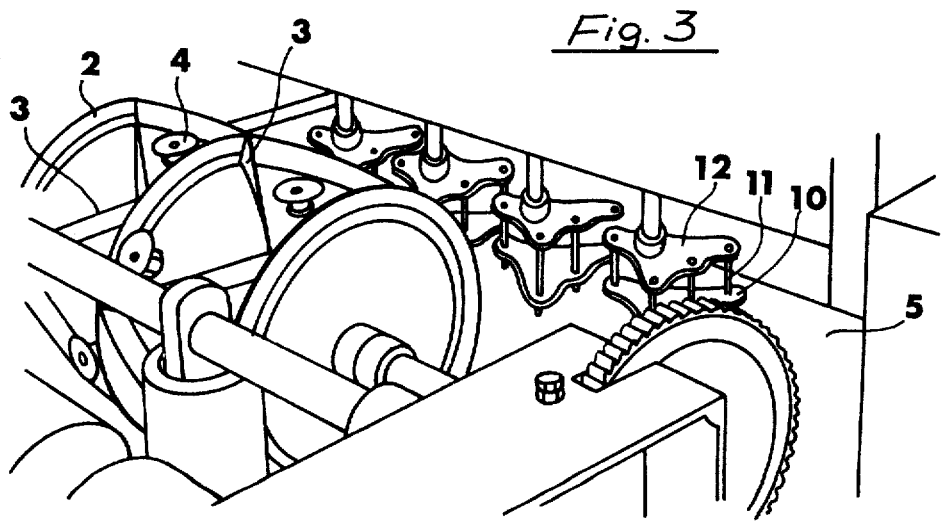
FIG. 3 illustrates, in detail, the catching elements of said sheet pastry triangles and, partially, the cutting cylinder.

Practically the aforesaid cylinder, by rotating on itself, with a peripheric speed equal to the advancing speed on the conveyor belt (5) of the flattened sheet pastry, cuts said sheet pastry in a plurality of triangles (6) which are properly adjoined (as it is indicatively illustrated in FIG. 6). From the arrangement of blades (3) as shown in FIG. 3, the pastry triangles upon being cut from the pastry sheet are oriented with a reference side of each pastry triangle in a first group thereof facing in one given direction with respect to the conveyance path, and with a similar reference side of each pastry triangle in a second group thereof facing in another given direction with respect to the conveyance path.

Then said sheet pastry triangles are engaged by a movable pointed element series, said pointed elements constituting an integral portion of suitable catching elements, these latter being mounted on a carriage (7) effective to reciprocate, by means of a wheel pair (8), along side guides (9).

The catching elements are rotatably moveable to orient the pastry triangles that they engage with their reference sides facing a common selected direction with respect to the conveyance path and translatably moveable to position the pastry triangles they engage in a given spacing relation to one another prior to releasing said pastry triangles.

The aforesaid catching elements consist of a shaped plate (10), having a substantially triangular shape and being provided with perimetrical holes thereinto pointed elements (11) insert rigid with and perpendicularly extending to an upper second plate (12), this latter being effective to move with respect to said shaped plate (10).

The lower plate (10) is supported, through a tubular element (13), by a sleeve (14), the upper plate (12) being telescopically coupled to said lower plate (10) and being engaged with a braket (15) located at the top of said sleeve.

Said tubular element 13 is furthermore provided with an intermediate sprocket gear, effective to be engaged by a rack (16), as formed on a rod (17) in turn telescopically coupled to a tubular lug (18) as perpendicularly formed on the aforesaid sleeve.

The braket (15) is supported, through a roller (19), by a rod (20) extending or stretched between the ends of two lever arms (21) pivoted behind the carriage (7).

As said lever arm engage suitably shaped or profiled cams (22) they periodically cause said upper plates (12) to rise and hence the pointed elements (11) to retract with respect to the base surface of the lower plates (10).

Practically, as the upper plate lowers, the aforesaid pointed elements engage one of the sheet pastry triangle (6), thereby imparting thereto a suitable rotation in such a way as to locate said triangle with its base in the advancing direction.

To this end it should be pointed out that the carriage (7) speed is equal to that of the conveyor belt (5) and accordingly the sheet pastry triangles are not subjected to sharp movements.

Those same sheet pastry triangles (6), in addition to a rotation action, are also subjected to an outwardly translation with respect to the conveyor belt axis, in such a way as to be suitably spaced at the forming machine input side.

To this end, the aforesaid catching elements are coupled to corresponding disc elements (23) as slidingly mounted on a shaft (24) provided with a longitudinal key (25).

The aforesaid disc elements are rigidly connected to a sleeve (26) on the side surface whereof is formed a sliding guide (27), wherewith engage the two arms of a fork (28), formed at the end of a lever (29), pivoted to a cross member of the carriage (7).

Said levers engage, in turn, with roller cams (30), providing differentiated path guides, in such a way as to cause said catching elements to suitably spread apart.

The rotation of said catching elements is provided by the engaging of the rods (17), carrying the racks (16), with the cam profiles (31), as laterally formed of said disc elements (23).

Said cam profiles, practically, cause said rods to reciprocate according to an advancing and withdrawing movement thereby causing said catching elements to rotate in a direction or in the opposed direction.

This arrangement is provided because of the fact that, in order to fully use the sheet pastry, the operation of the cutting cylinder creates, in succession, series of pastry triangles having opposed bases and which are thence required to be rotated through 90°, in one direction and then, alternately in sequence in the opposed direction to establish a flow of pastry triangles that are all similarly aligned.

The reciprocating movement of the carriage (7) is obtained by a lever (32) pivoted at the lower end thereof and articulated, at an intermediate point, through an arm (33), to a cam (34).

Figure 4:
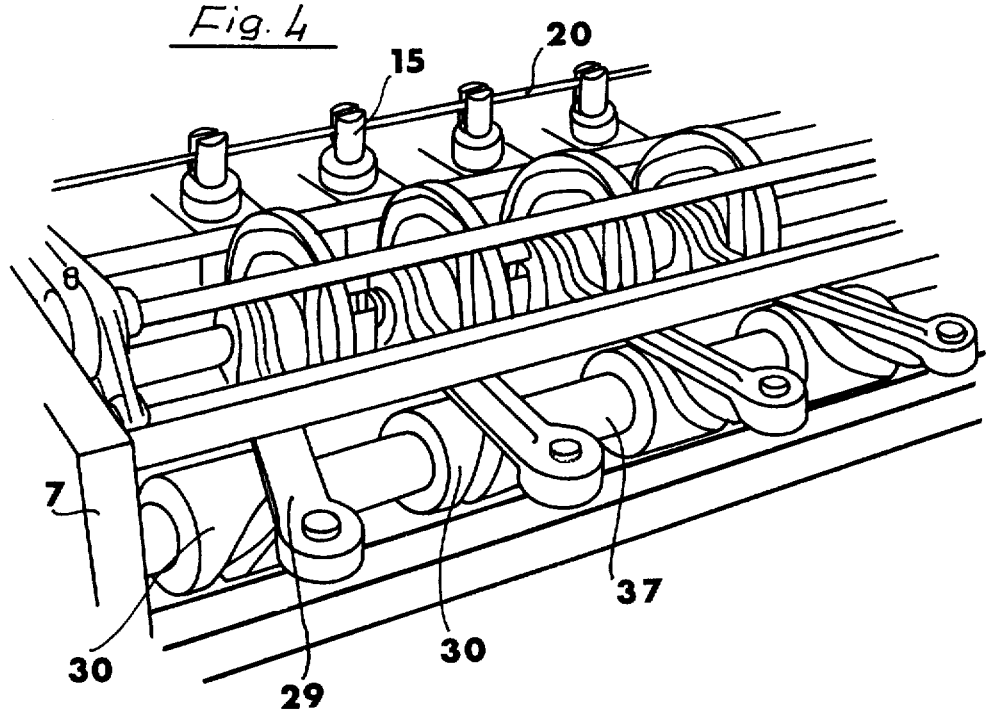
FIG. 4 illustrates the assembly for coordinately spacing said catching elements.
Figure 5:
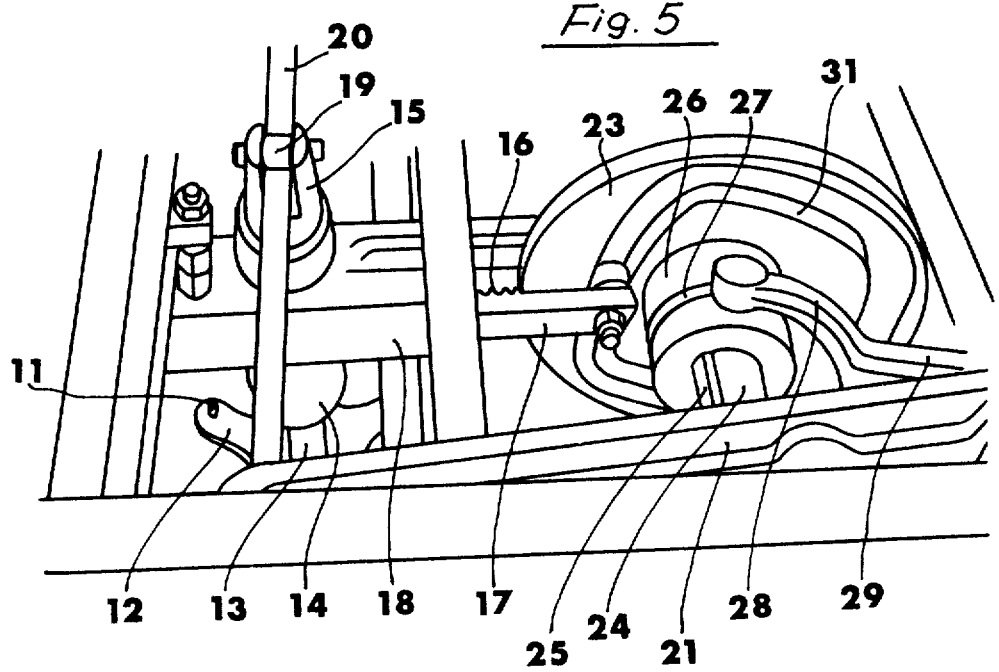
FIG. 5 illustrates the rotating mechanism for said catching elements.

The pivot of that same lever consists of a driving shaft thereonto a pinion (35) is keyed transmitting the movement, through a chain (36) to the shaft (37) carrying the aforesaid roller cams 30 (see FIG. 4).

This shaft, 37 in turn, through a gear pair (with a 1:2 ratio), drives in rotation the shaft (24) carrying the disc elements (23).

The sheet pastry triangles (6), as located with the bases thereof facing in the conveyor belt (5) advancing direction, engage, successively, with a movable baffle element (38) effective to perfectly align said sheet pastry triangles across a straight line generally perpendicular to the belt 5 advancement line, as seen from FIG. 8.

The rising movement of said baffle 38 element is obtained by a rod (39), pivoted to an arm (40) effective to upwardly or downwardly swing, due to the action of a side cam (41) that rotates and engages cam 40 as seen from FIG. 9.

Then, the aligned sheet pastry triangles 6 pass into the forming machine (42), shown in FIG. 8 which rolls up said triangles, thereby shaping said triangles as typically shown at 45 in FIG. 10.

More specifically, said forming machine comprises a cylinder (43), shown in FIG. 11 and which is provided with a recessed portion (44) effective to cause the finished product (45) to fall onto a conveyor output belt (46).

From the above description and the observation of the several figures of the accompanying drawings, the great functionality and use practicity characterizing the machine or apparatus for automatically making croissants, brioches and the like according to the present invention are self evident.

Obviously, the instant machine or apparatus and the making procedure therefor have been thereinabove described and illustrated only by way of an indicative and non limitative example and only to demonstrate the practicing and the general characteristics of the present invention.

Accordingly, in the light of the above it may be deduced that the instant forming machine and the component elements thereof may be subjected to several variations and modifications, according to the different making needs and specific practical use provided for said machine, being also susceptible to all improvements as suggested by the practical experience.

These variations may be brought about both to the operative elements thereinabove illustrated, which are characteristic of the present invention, and to the making and assembling procedure thereof, all without departing from the scope of the invention.

I claim:

1. A machine for forming croissants, brioches and the like which comprises a pastry flattening stage operable to receive pastry dough and to flatten such dough into a pastry sheet delivered along a given conveyance path; a cutting stage having rotatable cutter blades arranged to cut said pastry sheet into a sequence of pastry triangles positioned at respective locations across said conveyance path, said pastry triangles upon being cut from the pastry sheet being oriented with a reference side of each pastry triangle in a first group thereof facing in one given direction with respect to the conveyance path, and with a similar reference side of each pastry triangle in a second group thereof facing in another given direction with respect to the conveyance path; a spacing and orienting stage, including an oil bath means, effective to reciprocate on two wheels; a carriage reciprocatably moveable along said conveyance path and bearing a plurality of catching elements spaced across the conveyance path in correspondence with the spacing of said pastry triangles, and moveable into engagement with corresponding pastry triangles to move same and moveable out of engagement with said pastry triangles to release same after moving them, said catching elements being rotatably moveable to orient the pastry triangles that they engage with their reference sides facing a common selected direction with respect to the conveyance path, said catching elements being also translatably moveable to position the pastry triangles they engage in a given spacing relation to one another prior to releasing said pastry triangles; and a forming stage disposed along the conveyance path to receive said pastry triangles released by said catching elements of the spacing and orienting stage and operable to wrap said pastry triangles into respective coiled configurations; said carriage being reciprocatably moveable between a position on the conveyance path where the catching elements engage, and thereby receive the pastry triangles from the cutting stage, to a position on the conveyance path where the catching elements release and thereby deliver the oriented and spaced pastry triangles to the forming stage.

2. A machine according to claim 1 including at least one tie rod pivotally supported and driven by a cam to impart reciprocating movement to said carriage, and a plurality of cams and associated motion transmitting elements coupled to corresponding catching elements to impart thereto rotary and translatory motion to orient and space said pastry triangles.

3. A machine according to claim 1 wherein said catching elements move in a spreading apart relation and rotate through 90 degrees as the carriage moves in an advancing direction.

4. A machine according to claim 1 wherein said cutting stage includes a plurality of parallel disc elements spaced apart and supporting between them diagonally extending blades that cut said pastry sheet into pastry triangles, and a plurality of ejector members that operate to release from said blades the pastry triangles which they cut.

5. A machine according to claim 1 wherein said catching elements respectively include an upper plate, a lower plate moveable relative to said upper plate, a plurality of pointed members carried by said upper plate and extending through respective apertures in said lower plate to engage an underlying pastry triangle, said lower plate being supported, through a tubular element, by a sleeve, and said upper plate being pivotally connected to a bracket located on the top of said sleeve.

6. A machine according to claim 1 including a pinion coupled to each respective catching element, and a rack moveable in engagement with said pinion to impart thereto rotary movement to orient said pastry triangles.

7. A machine according to claim 1 including a cam driven mechanism coupled to said catching elements and operable to periodically move same upwardly out of engagement with the pastry triangles and downwardly into engagement with said pastry triangles.

8. A machine according to claim 1 including mechanism elements coupled to said catching elements and comprising discs slidably mounted on a longitudinally keyed shaft and operable to impart an outward translatory movement to said catching elements to move same into a spread-apart spacing arrangement as said catching elements move their corresponding pastry triangles from said cutting stage to said forming stage.

9. A machine according to claim 8, wherein said discs are rigid with a sleeve on the side surface of which a sliding guide is formed engaging the arms of corresponding fork elements, formed at the ends of levers pivoted to a cross member of said movable carriage, said levers engaging, in turn with roller cams, providing differentiated path guides, in such a way as to cause said catching elements to spread apart.

10. A machine according to claim 9 wherein the rotation movement of said respective catching elements is provided by a rack carrying rod with cam profiles formed laterally of said disc elements, said cam profiles causing said rod to reciprocate.

11. A machine according to claim 10 wherein the reciprocating movement of said carriage is obtained by a lever pivoted at the lower end thereof and pivoted at an intermediate point thereof, through an arm, to a cam, the pivot of said lever consisting of a driving shaft thereon a pinion is keyed, driving, through a chain element, a shaft carrying roller cams, said shaft, in turn, through a gear pair driving the shaft carrying said disc elements.

12. A machine according to claim 11 including moveable baffle element that engages the pastry triangles to perfectly align same along a generally straight line across the conveyance path prior to arrival of said pastry triangles at said forming station.

13. A machine according to claim 12 wherein said forming stage includes a cylinder having a recessed portion effective to cause the coiled pastry triangles to fall onto an output conveyor belt.

* * * * *